United States Patent
Haupt et al.

(10) Patent No.: US 10,300,887 B2
(45) Date of Patent: May 28, 2019

(54) POSITIONING WITH A MAGNETIC SENSOR FOR A VEHICLE

(71) Applicant: VOLKSWAGEN AG, Wolfsburg (DE)

(72) Inventors: Hannes Haupt, Braunschweig (DE); Bastian Bartels, Wolfsburg (DE)

(73) Assignee: Volkswagen AG (DE)

( * ) Notice: Subject to any disclaimer, the term of this patent is extended or adjusted under 35 U.S.C. 154(b) by 78 days.

(21) Appl. No.: 15/216,091

(22) Filed: Jul. 21, 2016

(65) Prior Publication Data

US 2017/0021805 A1 Jan. 26, 2017

(30) Foreign Application Priority Data

Jul. 22, 2015 (DE) .................. 10 2015 213 806

(51) Int. Cl.
| | |
|---|---|
| *B60R 25/24* | (2013.01) |
| *G01B 7/02* | (2006.01) |
| *G01C 21/08* | (2006.01) |
| *G05D 1/00* | (2006.01) |

(52) U.S. Cl.
CPC ............ *B60R 25/245* (2013.01); *B60R 25/24* (2013.01); *G01B 7/023* (2013.01); *G01C 21/08* (2013.01); *G05D 1/0011* (2013.01); *B60R 2325/101* (2013.01); *B60R 2325/105* (2013.01); *B60R 2325/205* (2013.01)

(58) Field of Classification Search
CPC .......................... B60R 25/245; B60R 25/24
See application file for complete search history.

(56) References Cited

U.S. PATENT DOCUMENTS

| | | | |
|---|---|---|---|
| 2006/0049922 A1 | 3/2006 | Kolpasky et al. | |
| 2007/0126426 A1* | 6/2007 | Clark ............... | E21B 47/02216 324/326 |
| 2007/0200672 A1 | 8/2007 | McBride et al. | |
| 2012/0310581 A1* | 12/2012 | Ryu ......................... | G01N 3/00 702/104 |
| 2013/0072115 A1* | 3/2013 | Dobyns ............... | H04B 5/0081 455/41.1 |
| 2014/0188309 A1* | 7/2014 | Caratto .................. | B60R 25/00 701/2 |
| 2014/0226855 A1* | 8/2014 | Savvides ............ | G06K 9/00771 382/103 |
| 2014/0243750 A1* | 8/2014 | Larsen ................ | A61M 5/1452 604/189 |
| 2014/0266594 A1 | 9/2014 | Reiser | |

(Continued)

FOREIGN PATENT DOCUMENTS

| | | |
|---|---|---|
| DE | 19712911 A1 | 10/1998 |
| DE | 19850176 C1 | 8/2000 |

(Continued)

OTHER PUBLICATIONS

Search Report for German Patent Application No. 10 2015 213 806.2; dated Feb. 19, 2016.

*Primary Examiner* — Jess Whittington

(74) *Attorney, Agent, or Firm* — Barnes & Thornburg LLP

(57) ABSTRACT

A method to determine a position of a portable apparatus relative to a vehicle including generating a magnetic field by the vehicle, detecting the magnetic field by a magnetic field sensor of the portable apparatus, and evaluating the magnetic field to determine the position of the portable apparatus relative to the vehicle.

29 Claims, 2 Drawing Sheets

(56) References Cited

U.S. PATENT DOCUMENTS

| | | | | |
|---|---|---|---|---|
| 2015/0004917 A1* | 1/2015 | Juzswik | ............... | H04B 17/318 455/67.13 |
| 2015/0149042 A1* | 5/2015 | Cooper | ................ | B60R 16/037 701/48 |
| 2015/0321643 A1* | 11/2015 | Nowottnick | ............ | H04W 4/70 340/5.6 |
| 2016/0195604 A1* | 7/2016 | Ryan | ........................ | G01S 5/16 398/118 |
| 2017/0014071 A1* | 1/2017 | Readdie | ............... | A61B 5/4833 |
| 2017/0169257 A1* | 6/2017 | Gonzales, Jr. | ... | G06K 19/06187 |

FOREIGN PATENT DOCUMENTS

| | | | | |
|---|---|---|---|---|
| DE | 102004024890 A1 | 12/2005 | | |
| DE | 102011104230 A1 | 4/2012 | | |
| DE | 102012017390 A1 | 5/2014 | | |
| DE | 102013227204 A1 | 7/2014 | | |
| EP | 1095198 A1 | 5/2001 | | |
| EP | 2178271 A1 | 4/2010 | | |
| JP | 2003058795 A | 2/2003 | | |
| JP | 2015041853 | * 8/2013 | ............... | H04B 5/02 |
| JP | 2015041853 A | 3/2015 | | |
| WO | 2004107276 A1 | 12/2004 | | |
| WO | 2015025464 A1 | 2/2015 | | |

* cited by examiner

POSITIONING WITH A MAGNETIC SENSOR FOR A VEHICLE

PRIORITY CLAIM

This patent application claims priority to German Patent Application No. 10 2015 213 806.2, filed 22 Jul. 2015, the disclosure of which is incorporated herein by reference in its entirety.

SUMMARY

Illustrative embodiments relate to the determination of a position of a portable apparatus relative to a vehicle with a magnetic field sensor.

BRIEF DESCRIPTION OF THE DRAWINGS

The disclosed embodiments are described in detail below with reference to the figures.

DETAILED DESCRIPTION OF THE DISCLOSED EMBODIMENTS

Figure 1:
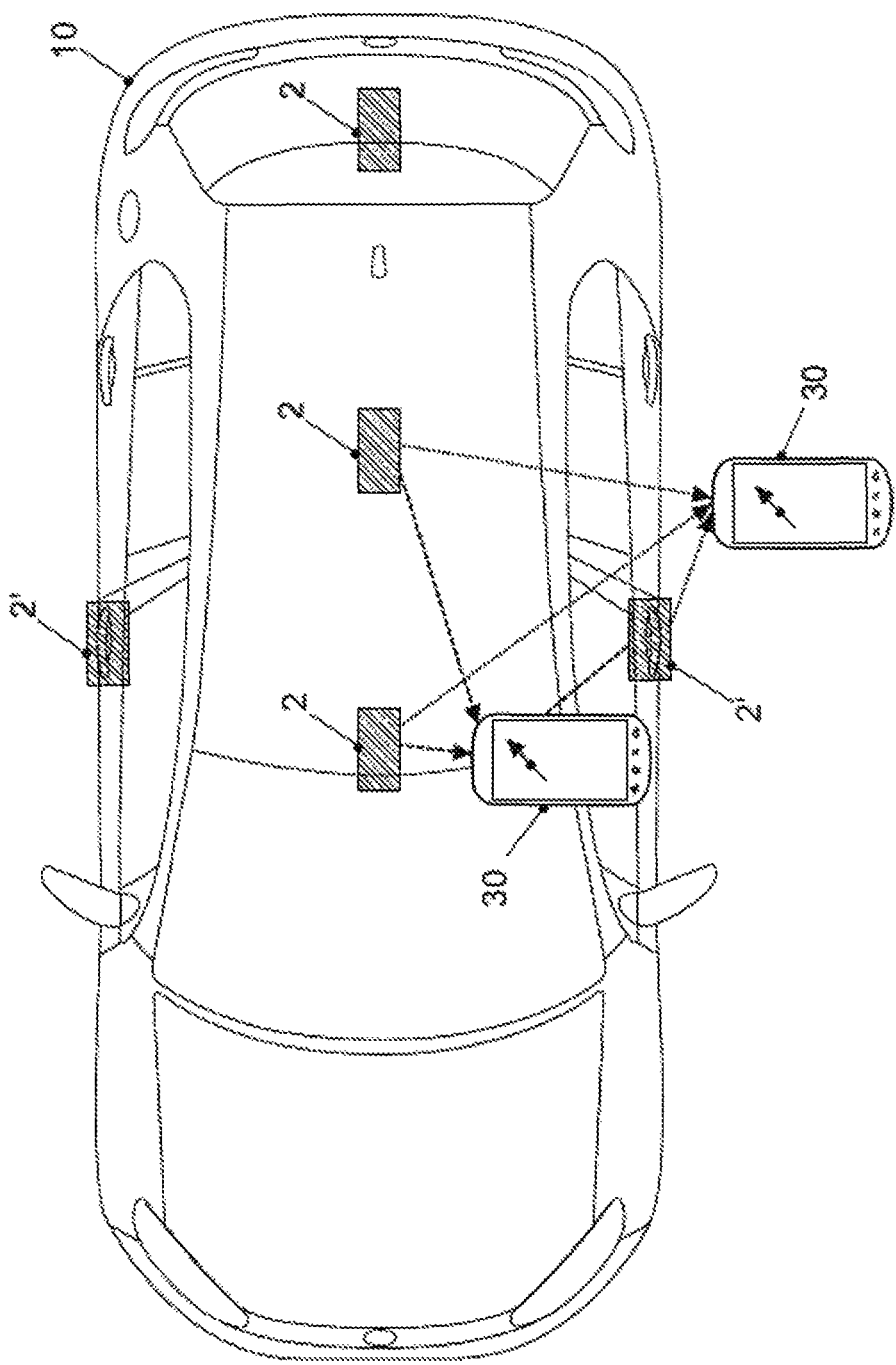
FIG. 1 shows portable apparatuses at different positions within an electromagnetic field generated by a vehicle.

Disclosed embodiments relate to the determination of a position of a portable apparatus relative to a vehicle with a magnetic field sensor.

US 2014/0266594 A1 describes a technique for starting a vehicle with a portable apparatus.

DE 197 12 911 A1 discloses a magnetic field sensor of a vehicle as part of a keyless entry system of the vehicle.

JP2003058795 A describes a system for renting a vehicle, wherein information is transmitted by means of a magnetic field.

According to the prior art, a PKE system ("Passive Keyless Entry/Go" system) is installed in many vehicles, the system enabling a customer to use the vehicle, wherein the customer has only to carry, but does not have to actuate, a key authorized for the vehicle to activate specific functions of the vehicle. However, the vehicle cannot be used if this key authorized for the vehicle is not carried.

Disclosed embodiments allow for operation of the vehicle with a different portable apparatus, i.e., a smartphone, instead of the key.

Disclosed embodiments provide a method for determining a position of a portable apparatus relative to a vehicle by a method for activating a vehicle function by a portable apparatus by a system and by a computer program product.

Disclosed embodiments provide a method for determining a position of a portable apparatus, i.e., a smartphone, relative to a vehicle. The disclosed method comprises the following operations:

Generating a magnetic field by means of the vehicle. Particularly with its LF antennas ("Low Frequency"; LF antennas operate in the kHz range), the vehicle generates an alternating field, e.g., an electromagnetic field. This electromagnetic field has the magnetic field, so to speak, as a constituent or component.

Detecting the magnetic field using a magnetic field sensor of the portable apparatus.

Evaluating the detected magnetic field to determine the position of the portable apparatus within the magnetic field and therefore relative to the vehicle. With knowledge of the location and size of the electromagnetic field and therefore the magnetic field, and with knowledge of the position of the vehicle within the magnetic field, the position of the portable apparatus relative to the vehicle can also be determined by determining the position of the portable apparatus within the magnetic field.

Whereas LF antennas of a wireless key are used according to the prior art for detection of the electromagnetic field of the vehicle and thus for position determination, the electromagnetic field (more precisely the magnetic field component of the electromagnetic field) is detected with a magnetic field sensor. Since this magnetic field sensor is present in most smartphones to implement, for example, a compass function, hardware modification of a smartphone is not required to implement the disclosed embodiments. The use of antennas for position determination relative to the vehicle is therefore not required by the portable apparatus, so that the portable apparatus described comprises no antenna for the position determination relative to the vehicle. The use of LF antennas is not required by the portable apparatus, so that the portable apparatus described comprises no LF antenna.

According to at least one disclosed embodiment, the Earth's magnetic field can be taken into account in the evaluation of the magnetic field. In this disclosed embodiment, the Earth's magnetic field is detected, for example, during a calibration process, or the results of a mapping of the Earth's magnetic field are imported to be able to perform the evaluation of the detected magnetic field depending on the Earth's magnetic field.

In this disclosed embodiment, the measurement results captured by the magnetic field sensor are interpreted, in a manner of speaking, as an overlay over the magnetic field generated by the vehicle and the Earth's magnetic field. With knowledge of the Earth's magnetic field, the component of the Earth's magnetic field can thus be eliminated from the respective measurement result to take account in the evaluation of only the component of the magnetic field generated by the vehicle.

The magnetic field sensor is designed to detect only a magnetic field component of an electromagnetic field as the magnetic field. In other words, the magnetic field sensor is designed to detect only the magnetic field component(s) (and not an electric or electromagnetic field component) of the electromagnetic field generated by the vehicle. In other words, the magnetic field sensor is also capable of detecting the strength and direction of a static magnetic field.

A Hall sensor or an xMR sensor can be used as a magnetic field sensor.

A Hall sensor is based on the Hall effect. An xMR sensor is understood to mean a thin-film sensor which modifies its (ohmic) resistance under the influence of the magnetic flux of the magnetic field. An xMR sensor is also referred to as x-magnetoresistive. A distinction is made, for example, between AMR sensors (which are based on the anisotropic magnetoresistive effect), CMR sensors (which are based on the colossal magnetoresistive effect), GMR sensors (which are based on the GMR ("giant magnetoresistance") effect) and TMR sensors (which are based on the tunnel magnetoresistance or TMR effect).

As a general rule, the portable apparatus comprises transmitting means to set up a radio link to the vehicle and to transmit the position of the portable apparatus or the measurement results from the magnetic field sensor or field strengths of the magnetic field via this radio link to the vehicle. This radio link is based, for example, on Bluetooth, WLAN, GSM and/or mobile radiocommunication. The magnetic field measured values are transmitted in an integral and authentic manner, as a result of which the vehicle is capable of checking or verifying that the measurement results are uncorrupted (integral) and also originate from the correct portable apparatus (authentic). To do this, the portable apparatus can operate with a cryptographic secret when transmitting the measurement results (e.g., the measurement results can be encrypted using this cryptographic secret), the secret also being known to the vehicle.

A check can also be carried out via this radio link by means of a challenge-response method, depending on the position of the portable apparatus relative to the vehicle to determine whether the portable apparatus has an authorization for the vehicle.

With this challenge-response method, the vehicle sends a query (challenge), depending on which the portable apparatus proves that the portable apparatus has specific information, without divulging this information itself in the process. For example, the query may comprise a specific character string which is then converted by the portable apparatus using a specific algorithm which operates with a predefined password, and is transmitted back to the vehicle. On the basis of the response from the portable apparatus, the vehicle can check whether the portable apparatus knows the specific information (the specific password) and is therefore authorized for the vehicle.

In addition, disclosed embodiments provide a method for activating a vehicle function comprising the following operations:

Determining a position of a portable apparatus (i.e., a smartphone) relative to the vehicle according to the previously described method for determining the position of the portable apparatus.

Detecting an authorization of the portable apparatus for the vehicle. On the basis of this step, a check is carried out to determine whether the portable apparatus is authorized for the vehicle, wherein the check can be performed, for example, using the previously described challenge-response method.

Activating the vehicle function depending on the detected authorization and the determined position. This means that the function or a specific vehicle function can be activated only if, on the one hand, the portable apparatus is authorized for the vehicle, and if, on the other hand, the position of the portable apparatus relative to the vehicle corresponds to the specific function.

Knowledge of the position of the portable apparatus relative to the vehicle is required to activate specific vehicle functions. For example, a drive motor of the vehicle can normally be started only if the portable apparatus authorized for the vehicle is detected inside the vehicle. Since the disclosed method for activating the vehicle function uses the disclosed method for determining the position of the portable apparatus relative to the vehicle, the benefits described above (e.g., use of a conventional smartphone) apply also to the disclosed method for activating the vehicle functions.

According to the disclosed embodiments, a portable apparatus (i.e., a smartphone) is also provided which comprises a magnetic field sensor and evaluation means. The magnetic field sensor is designed to detect a magnetic field (i.e., as a magnetic field component of an electromagnetic field generated by a vehicle). The evaluation means are designed to determine a position of the portable apparatus within the magnetic field depending on measurement results from the magnetic field detected by the magnetic field sensor.

Using its magnetic field sensor, the portable apparatus is capable of determining its position within the magnetic field and therefore within an electromagnetic field. If the position of the generator (e.g., a vehicle) of the electromagnetic field and therefore of the magnetic field within this magnetic field is known, the portable apparatus can also determine its position relative to the generator (e.g., vehicle) on the basis of its position within the magnetic field.

Furthermore, disclosed embodiments provide a system which comprises a vehicle, a portable apparatus and evaluation means. The vehicle comprises one or more antennas (e.g., LF antennas) for generating an electromagnetic field. The portable apparatus comprises a magnetic field sensor for detecting with this magnetic field sensor a magnetic field as a magnetic field component of the electromagnetic field. The evaluation means are designed to determine a position of the portable apparatus within the magnetic field and therefore relative to the vehicle depending on measurement results (e.g., measured field strengths) from the magnetic field detected by the magnetic field sensor.

The benefits of the disclosed system essentially correspond to the benefits of the disclosed method, which are set out in detail above, so that no repetition is required.

The following embodiments exist for the system:

According to a first disclosed embodiment, the evaluation means are arranged inside the portable apparatus so that, in this disclosed embodiment, the detected field strengths are evaluated inside the portable apparatus and the position relative to the vehicle is determined inside the portable apparatus.

According to a second disclosed embodiment, the evaluation means are arranged outside the vehicle. In this second disclosed embodiment, the portable apparatus comprises transmitting means to transmit the measurement results or raw data from the magnetic field sensor to receiving means of the vehicle and therefore to the vehicle. In this second disclosed embodiment, the measurement results are evaluated inside the vehicle and the position of the portable apparatus relative to the vehicle is thus determined inside the vehicle.

According to the disclosed embodiments, a vehicle can also be provided which comprises one or more antennas for generating an electromagnetic field, receiving means and evaluation means. The receiving means are designed to receive measurement results or raw data from a magnetic field sensor of a portable apparatus which is located within the electromagnetic field. The evaluation means are designed to determine the position of the portable apparatus within the electromagnetic field and therefore relative to the vehicle depending on the measurement results from the magnetic field sensor.

The disclosed vehicle is designed to carry out the disclosed methods described above.

Finally, a computer program product, i.e., a computer program or software which can be loaded into a memory of a portable apparatus, is provided. All or various previously described embodiments of the methods can be executed with this computer program product when the computer program product runs in the controller of the portable apparatus. The computer program product possibly requires program means, e.g., libraries and auxiliary functions, to implement the corresponding embodiments of the methods. In other words, a computer program or software, with which one of the embodiments of the disclosed methods described above for determining a position of a portable apparatus relative to a vehicle can be implemented or with which the disclosed method for activating a vehicle function with the portable apparatus can be carried out is intended to be placed under protection with the claim focusing on the computer program product. The software may be a source code (e.g., C++) which has still to be compiled (translated) and linked or which has only to be interpreted, or an executable software code which has only to be loaded into the corresponding processing unit or control unit for execution.

With the disclosed embodiments, a conventional smartphone with a magnetic field sensor can be used to determine the position of the smartphone relative to the vehicle. The LF antennas installed in the vehicle generate a sequence consisting of electromagnetic fields for the key search. These fields contain a strong magnetic component which is detected with the magnetic field sensor of the smartphone and can be used for the position determination relative to the vehicle. The magnetic field sensor (or compass) in the portable apparatus or in the smartphone is detuned by the magnetic field component of the electromagnetic fields generated by the LF antennas of the vehicle, wherein the extent of this detuning is detected and evaluated with a suitable algorithm to determine the position of the portable apparatus within the field and therefore relative to the vehicle.

The disclosed embodiments are suitable for motor vehicles. The disclosed embodiments are obviously not restricted to the field of application but can also be used for ships or aircraft and track-bound or rail-guided vehicles. Even the use for stationary objects (e.g., in building technology) is conceivable.

FIG. 1 shows a vehicle 10 which comprises three LF internal antennas 2 and two LF external antennas 2' close to door handles of the vehicle 10. In addition, FIG. 1 shows mobile terminal devices (portable apparatuses) 30 at two different positions (one in the vehicle passenger compartment and one outside the vehicle 10). The vehicle 10 generates an electromagnetic field by means of its five LF antennas 2, 2'. With its magnetic field sensor (see FIG. 2), the portable apparatus 30 comprises the magnetic field component of this electromagnetic field. For example, by means of a variation over time in the field strength and/or direction of this magnetic field component, the position of the portable apparatus 30 within the electromagnetic field can be determined. Since the position of the vehicle 10 within the electromagnetic field is also known, the position of the portable apparatus 30 relative to the vehicle 10 can therefore also be determined by means of the position of the portable apparatus 30 within the electromagnetic field.

In the example shown in FIG. 1, it can thus be determined for the two shown positions of the portable apparatus 30 whether the portable apparatus 30 is located inside or outside the vehicle 10. To do this, the magnetic field sensor or compass sensor of the mobile terminal device 30 detects the magnetic field component of the field generated by the respective LF antenna 2, 2'. The mobile terminal device 30 can then determine its position relative to the respective LF antenna 2, 2' and thereby its position relative to the vehicle 10 by means of the measurement results from its magnetic field sensor.

Figure 2:
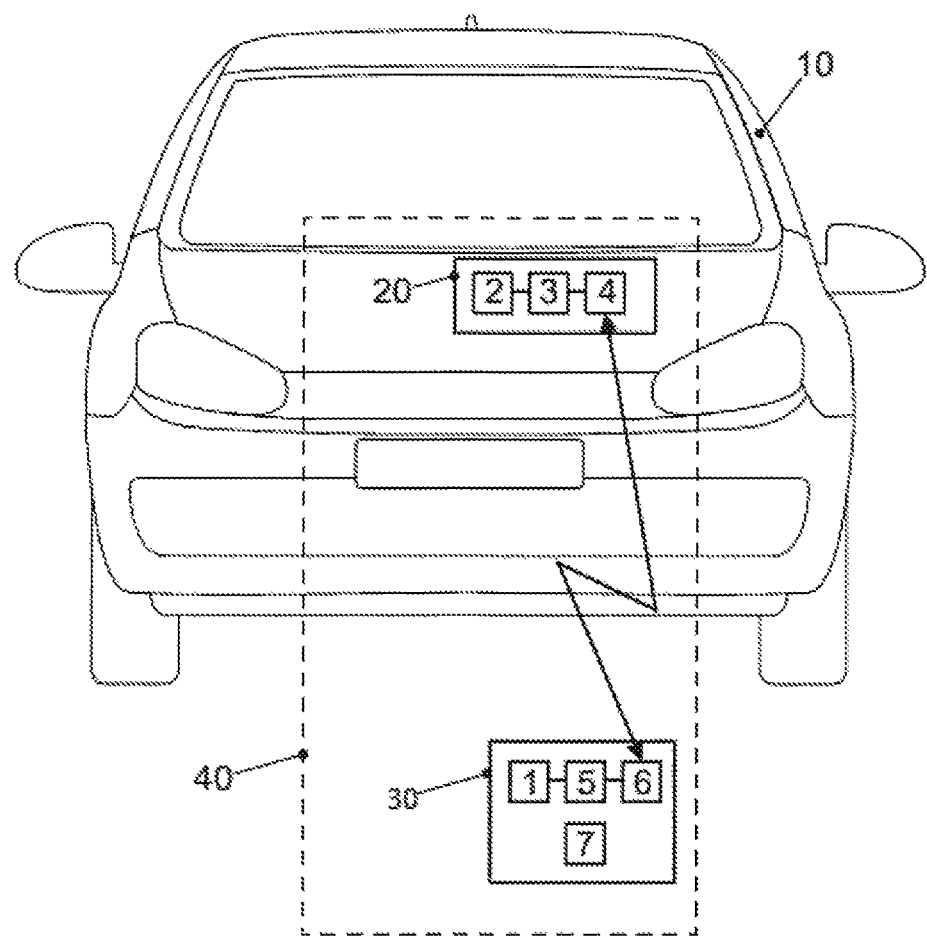
FIG. 2 shows schematically a portable apparatus according to the disclosed embodiments and a disclosed system.

FIG. 2 shows schematically a vehicle 10, an apparatus 20 inside the vehicle 10, a portable apparatus 30 and a system 40 which comprises the apparatus 20 and the portable apparatus 30. The apparatus 20 of the vehicle 10 for its part comprises, along with a controller 3, an LF antenna 2 and a Bluetooth antenna 4. The portable apparatus 30 comprises, along with a controller 5, a magnetic field sensor 1, a Bluetooth antenna 6 and a memory 7 in which, for example, software embodying a disclosed method can be stored.

The LF antenna 2 generates an electromagnetic field to distinguish whether a key authorized for the vehicle 10 (or a portable apparatus 30 authorized for the vehicle 10) is located inside or outside the vehicle 10. The magnetic field component of this electromagnetic field is detected with the magnetic field sensor 1. The portable apparatus 30 transmits either the position relative to the vehicle 10 (i.e., the information indicating whether the portable apparatus 30 is located inside or outside the vehicle 10, or information relating to the measurement results from its magnetic field sensor 1 to the vehicle 10 via the corresponding radio link (in the example shown via the Bluetooth antennas 4, 6). In the second case, the vehicle 10 determines the position of the portable apparatus 30 on the basis of the information relating to the measurement results (i.e., indicating whether the portable apparatus 30 is located inside or outside the vehicle 10). In addition, by means of a communication via this radio link, it is determined by the vehicle 10 or by the apparatus 20 in the vehicle 10 whether the portable apparatus 30 has an authorization for the vehicle 10. Depending on the transmitted position (i.e., the information indicating whether the portable apparatus 30 is located inside or outside the vehicle 10) and the authorization, the vehicle 10 releases specific vehicle functions for activation.

REFERENCE NUMBER LIST

1 Magnetic field sensor
2, 2' LF antenna
3 Controller
4 Antenna
5 Controller
6 Antenna
7 Memory
10 Vehicle
20 Apparatus
30 Smartphone
40 System

The invention claimed is:

1. A method for determining a position of a portable apparatus relative to a transportation vehicle, the method comprising:
   generating an electromagnetic field by the transportation vehicle using a plurality of low frequency antennas positioned on the transportation vehicle;
   detecting only a magnetic field component of the electromagnetic field by a magnetic field sensor of the portable apparatus positioned relative to the transportation vehicle, wherein the magnetic field sensor detects a strength and direction of the magnetic field component of the electromagnetic field as the detected magnetic field component without detection of an electric field component of the electromagnetic field generated by the transportation vehicle;
   evaluating only the detected magnetic field component to determine a position of the portable apparatus relative to the transportation vehicle by determining a position of the portable apparatus within the electromagnetic field generated by the transportation vehicle based on variation of the strength and direction of only the magnetic field component over time without reference to the electric field component of the electromagnetic field generated by the transportation vehicle;
   verifying whether measurement values of the detected magnetic field component or the determined position of the portable apparatus transmitted to the transportation vehicle are uncorrupted and originate from the portable apparatus based on a cryptographic secret used to encrypt that transmission to the transportation vehicle, wherein the cryptographic secret is known to the portable apparatus and also the transportation vehicle; and
checking an authorization of the portable apparatus for the transportation vehicle by a challenge-response method via the radio link depending on the verified and uncorrupted position of the portable apparatus, wherein the challenge-response method comprises:
sending a query including challenge information from the transportation vehicle to the portable apparatus;
modifying the challenge information into response information with the portable apparatus based on security information stored in the portable apparatus;
transmitting the response information form the portable apparatus to the transportation vehicle without transmitting the security information; and
checking with the transportation vehicle that the security information is stored on the portable apparatus based on the response information.

2. The method of claim 1, wherein the evaluation of the detected magnetic field comprises taking into consideration a magnetic field of the Earth, wherein the Earth's magnetic field is detected during a calibration process, or results of a mapping of the Earth's magnetic field are imported to perform the evaluation of the detected magnetic field depending on the Earth's magnetic field, wherein the evaluation of the detected magnetic field are interpreted as an overlay over the magnetic field generated by the transportation vehicle and the Earth's magnetic field thereby eliminating an affect of the Earth's magnetic field from the detected magnetic field result to take account in the evaluation of only the magnetic field component generated by the transportation vehicle.

3. The method of claim 1, wherein the portable apparatus is a smartphone.

4. The method of claim 1, wherein the magnetic field sensor comprises a Hall sensor or an xMR sensor.

5. The method of claim 1, further comprising transmitting the position of the portable apparatus or measurement results from the magnetic field sensor via a radio link from the portable apparatus to the transportation vehicle, wherein the radio link is based on Bluetooth, WLAN, GSM and/or mobile radio communication.

6. A method for activating a transportation vehicle function, the method comprising:
determining a position of a portable apparatus relative to the transportation vehicle by generating an electromagnetic field by the transportation vehicle using a plurality of low frequency antennas positioned on the transportation vehicle, detecting only a magnetic field component of the electromagnetic field by a magnetic field sensor of the portable apparatus positioned relative to the transportation vehicle, wherein the magnetic field sensor detects a strength and direction of the magnetic field component of the electromagnetic field as the detected magnetic field component without detection of an electric field component of the electromagnetic field generated by the transportation vehicle;
evaluating only the detected magnetic field component to determine a position of the portable apparatus relative to the transportation vehicle by determining a position of the portable apparatus within the electromagnetic field generated by the transportation vehicle based on variation of the strength and direction of only the magnetic field component over time without reference to the electric field component of the electromagnetic field generated by the transportation vehicle;
verifying whether measurement values of the detected magnetic field component or the determined position of the portable apparatus transmitted to the transportation vehicle are uncorrupted and originate from the portable apparatus based on a cryptographic secret used to encrypt that transmission to the transportation vehicle, wherein the cryptographic secret is known to the portable apparatus and also the transportation vehicle;
checking an authorization of the portable apparatus for the transportation vehicle by a challenge-response method via the radio link depending on the verified and uncorrupted position of the portable apparatus, wherein the challenge-response method comprises:
sending a query including challenge information from the transportation vehicle to the portable apparatus;
modifying the challenge information into response information with the portable apparatus based on security information stored in the portable apparatus;
transmitting the response information form the portable apparatus to the transportation vehicle without transmitting the security information; and
checking with the transportation vehicle that the security information is stored on the portable apparatus based on the response information;
detecting an authorization of the portable apparatus; and
activating the transportation vehicle function depending on the authorization and the determined position of the portable apparatus.

7. The method of claim 6, wherein the evaluation of the detected magnetic field comprises taking into consideration a magnetic field of the Earth, wherein the Earth's magnetic field is detected during a calibration process, or results of a mapping of the Earth's magnetic field are imported to perform the evaluation of the detected magnetic field depending on the Earth's magnetic field, wherein the evaluation of the detected magnetic field are interpreted as an overlay over the magnetic field generated by the transportation vehicle and the Earth's magnetic field thereby eliminating an affect of the Earth's magnetic field from the detected magnetic field result to take account in the evaluation of only the magnetic field component generated by the transportation vehicle.

8. The method of claim 6, wherein the portable apparatus is a smartphone.

9. The method of claim 6, wherein the magnetic field sensor comprises a Hall sensor or an xMR sensor.

10. The method of claim 6, further comprising transmitting the position of the portable apparatus or measurement results from the magnetic field sensor via a radio link from the portable apparatus to the transportation vehicle, wherein the radio link is based on Bluetooth, WLAN, GSM and/or mobile radio communication.

11. A portable apparatus comprising:
a magnetic field sensor that detects only a magnetic field component of an electromagnetic field generated by a transportation vehicle using a plurality of low frequency antennas positioned on the transportation vehicle, wherein the magnetic field sensor detects a strength and direction of the magnetic field component of the electromagnetic field generated by the transportation vehicle as the detected magnetic field without detection of an electric component of the electromagnetic field generated by the transportation vehicle; and
an evaluation component that determines a relative position of the portable apparatus and the transportation vehicle relative to each other depending on the magnetic field component detected by the magnetic field sensor, wherein the position of the portable apparatus relative to the transportation vehicle is determined by evaluating only the detected magnetic field component to determine a position of the portable apparatus within the electromagnetic field generated by the transportation vehicle based on variation of the strength and direction of only the magnetic field component over time without reference to the electric component of the electromagnetic field generated by the transportation vehicle, wherein the portable apparatus transmits measurement values of the detected magnetic field component or the determined position of the portable apparatus to the transportation vehicle in a manner that enables verification of that transmitted data as uncorrupted and originating from the portable apparatus by transmitting that data following encryption using a cryptographic secret, wherein the cryptographic secret is known to the portable apparatus and also the transportation vehicle, and wherein the portable apparatus is authenticated by the transportation vehicle by a challenge-response method via the radio link depending on the verified and uncorrupted position of the portable apparatus, wherein the challenge-response method comprises:

sending a query including challenge information from the transportation vehicle to the portable apparatus;

modifying the challenge information into response information with the portable apparatus based on security information stored in the portable apparatus;

transmitting the response information form the portable apparatus to the transportation vehicle without transmitting the security information; and checking with the transportation vehicle that the security information is stored on the portable apparatus based on the response information.

12. The portable apparatus of claim 11, wherein a transportation vehicle function is activated based on the determined position of the portable apparatus relative to the transportation vehicle, the portable apparatus sends an authorization to the transportation vehicle to activate the transportation vehicle function depending on the authorization and the determined position of the portable apparatus relative to the transportation vehicle.

13. The portable apparatus of claim 11, wherein the evaluation of the detected magnetic field comprises taking into consideration a magnetic field of the Earth, wherein the Earth's magnetic field is detected during a calibration process, or results of a mapping of the Earth's magnetic field are imported to perform the evaluation of the detected magnetic field depending on the Earth's magnetic field, wherein the evaluation of the detected magnetic field are interpreted as an overlay over the magnetic field generated by the transportation vehicle and the Earth's magnetic field thereby eliminating an affect of the Earth's magnetic field from the detected magnetic field result to take account in the evaluation of only the magnetic field component generated by the transportation vehicle.

14. The portable apparatus of claim 11, wherein the portable apparatus is a smartphone.

15. The portable apparatus of claim 11, wherein the magnetic field sensor comprises a Hall sensor or an xMR sensor.

16. The portable apparatus of claim 11, wherein the position of the portable apparatus or measurement results are transmitted from the magnetic field sensor via a radio link from the portable apparatus to the transportation vehicle, wherein the radio link is based on Bluetooth, WLAN, GSM and/or mobile radio communication.

17. A system comprising:

a transportation vehicle that comprises a plurality of low frequency antennas positioned on the transportation vehicle for generating an electromagnetic field, wherein the magnetic field sensor detects a strength and direction of the magnetic field component of the electromagnetic field generated by the transportation vehicle as the detected magnetic field component without detection of an electric field component of the electromagnetic field generated by the transportation vehicle;

a portable apparatus that comprises a magnetic field sensor that detects only a magnetic field component of the electromagnetic field generated by the transportation vehicle; and an evaluation component that determines a position of the portable apparatus relative to the transportation vehicle depending on the magnetic field detected by the magnetic field sensor, wherein the position of the portable apparatus relative to the transportation vehicle is determined by evaluating only the detected magnetic field component to determine a position of the portable apparatus within the electromagnetic field based on variation of the strength and direction of the magnetic field component over time without reference to the electric component of the electromagnetic field generated by the transportation vehicle, wherein the portable apparatus transmits measurement values of the detected magnetic field component or the determined position of the portable apparatus to the transportation vehicle in a manner that enables verification of that transmitted data as uncorrupted and originating from the portable apparatus by transmitting that data following encryption using a cryptographic secret, wherein the cryptographic secret is known to the portable apparatus and also the transportation vehicle, wherein the portable apparatus is authenticated by the transportation vehicle by a challenge-response method via the radio link depending on the verified and uncorrupted position of the portable apparatus, wherein the challenge-response method comprises:

sending a query including challenge information from the transportation vehicle to the portable apparatus;

modifying the challenge information into response information with the portable apparatus based on security information stored in the portable apparatus;

transmitting the response information form the portable apparatus to the transportation vehicle without transmitting the security information; and checking with the transportation vehicle that the security information is stored on the portable apparatus based on the response information.

18. The system of claim 17, wherein the evaluation component is arranged in the portable apparatus, and the portable apparatus further comprises a transmitter for transmitting the measurement results from the magnetic field sensor to the transportation vehicle.

19. The system of claim 17, wherein a transportation vehicle function is activated based on the determined position of the portable apparatus relative to the transportation vehicle, the portable apparatus sends an authorization to the transportation vehicle to activate the transportation vehicle function depending on the authorization and the determined position of the portable apparatus.

20. The system of claim 17, wherein the evaluation of the detected magnetic field comprises taking into consideration a magnetic field of the Earth, wherein the Earth's magnetic field is detected during a calibration process, or results of a mapping of the Earth's magnetic field are imported to perform the evaluation of the detected magnetic field depending on the Earth's magnetic field, wherein the evaluation of the detected magnetic field are interpreted as an overlay over the magnetic field generated by the transportation vehicle and the Earth's magnetic field thereby eliminating an affect of the Earth's magnetic field from the detected magnetic field result to take account in the evaluation of only the magnetic field component generated by the transportation vehicle.

21. The system of claim 17, wherein the portable apparatus is a smartphone.

22. The system of claim 17, wherein the magnetic field sensor comprises a Hall sensor or an xMR sensor.

23. The system of claim 17, wherein the position of the portable apparatus or measurement results are transmitted from the magnetic field sensor via a radio link from the portable apparatus to the transportation vehicle, wherein the radio link is based on Bluetooth, WLAN, GSM and/or mobile radio communication.

24. A computer program product comprising a program wherein the computer program is loadable directly into a non-transitory memory of a portable apparatus, computer readable instructions for carrying out method operations when the program is executed in a controller of the portable apparatus, wherein the method comprises:
  detecting a magnetic field, generated using a plurality of low frequency antennas positioned on a transportation vehicle, by a magnetic field sensor of the portable apparatus, wherein the magnetic field sensor detects a strength and direction of a magnetic field component of the electromagnetic field as the detected magnetic field without detection of an electric component of the electromagnetic field generated by the transportation vehicle; and
  evaluating only the detected magnetic field to determine a relative position of the portable apparatus and the transportation vehicle relative to each other by determining a position of the portable apparatus within the electromagnetic field generated by the transportation vehicle based on variation of the strength and direction of the magnetic field component over time without reference to the electric component of the electromagnetic field generated by the transportation vehicle;
  verifying whether measurement values of the detected magnetic field component or the determined position of the portable apparatus transmitted to the transportation vehicle are uncorrupted and originate from the portable apparatus based on a cryptographic secret used to encrypt that transmission to the transportation vehicle, wherein the cryptographic secret is known to the portable apparatus and also the transportation vehicle; and
  checking an authorization of the portable apparatus for the transportation vehicle by a challenge-response method via the radio link depending on the verified and uncorrupted position of the portable apparatus, wherein the challenge-response method comprises:
    sending a query including challenge information from the transportation vehicle to the portable apparatus;
    modifying the challenge information into response information with the portable apparatus based on security information stored in the portable apparatus;
    transmitting the response information form the portable apparatus to the transportation vehicle without transmitting the security information; and
    checking with the transportation vehicle that the security information is stored on the portable apparatus based on the response information.

25. The computer program product of claim 24, wherein a transportation vehicle function is activated based on the determined position of the portable apparatus relative to the transportation vehicle, the portable apparatus sends an authorization to the transportation vehicle to activate the transportation vehicle function depending on the authorization and the position.

26. The computer program product of claim 24, wherein the evaluation of the magnetic field comprises taking into consideration a magnetic field of the Earth, wherein the Earth's magnetic field is detected during a calibration process, or results of a mapping of the Earth's magnetic field are imported to perform the evaluation of the detected magnetic field depending on the Earth's magnetic field, wherein the evaluation of the detected magnetic field are interpreted as an overlay over the magnetic field generated by the transportation vehicle and the Earth's magnetic field thereby eliminating an affect of the Earth's magnetic field from the detected magnetic field result to take account in the evaluation of only the magnetic field component generated by the transportation vehicle.

27. The computer program product of claim 24, wherein the portable apparatus is a smartphone.

28. The computer program product of claim 24, wherein the magnetic field sensor comprises a Hall sensor or an xMR sensor.

29. The computer program product of claim 24, wherein the position of the portable apparatus or measurement results are transmitted from the magnetic field sensor via a radio link from the portable apparatus to the transportation vehicle, wherein the radio link is based on Bluetooth, WLAN, GSM and/or mobile radio communication.

* * * * *